3,335,114
POLYCARBONAMIDES FROM p-PHENYLENE-
BIS(DIMETHYLACETIC ACID) AND ITS DE-
RIVATIVES
William A. H. Huffman, Durham, and John R. Holsten
and Jack Preston, Raleigh, N.C., assignors to Monsanto
Company, St. Louis, Mo., a corporation of Delaware
No Drawing. Filed Sept. 13, 1963, Ser. No. 308,635
2 Claims. (Cl. 260—78)

This invention relates to the production of novel synthetic linear condensation polymers. More particularly, this invention relates to the preparation of synthetic linear polycarbonamides formed by condensing p-phenylenebis(dimethylacetic acid) or a derivative thereof with selected diamines.

Polyamides have been known in the art for many years. The known synthetic linear polyamides are prepared from polymerizable monoamino-carboxylic acids or their amide forming derivatives, or from suitable diamines and suitable dicarboxylic acids or amide-forming derivatives of these compounds. These polyamides possess a number of physical properties such as toughness and high tensile strength that make them of great value in many applications. The preparation of such polymers are described in numerous patents. However, prior experience has shown that fibers from such polyamides although of good strength are deficient in stability to heat, moisture, and oxidative or other degrading conditions. Therefore, it is desirable to provide polyamides having improved stability to heat, light, oxygen, moisture, and other conditions which degrade the excellent properties of fibers from common polyamides. Such polyamides would be very desirable for use in the manufacture of textile filaments, fibers, yarns or the like. Such a fiber should retain many of the desirable properties of textile articles manufactured from the known synthetic linear polyamides, and also be easily made and amenable to being processed into filaments and other elongated flexible articles by conventional spinning and filament forming procedures and the like.

It is an object of the present invention to provide novel synthetic linear carbonamides.

It is another object of the present invention to provide novel synthetic linear polycarbonamides suitable as fiber materials, film materials, molded articles, and the like.

It is a further object of the present invention to provide a method for the manufacture of useful and novel synthetic linear polycarbonamides that have improved resistance to degradation.

Other objects and advantages of the present invention will become apparent from the following detailed description of the invention.

In general, the novel synthetic linear polycarbonamides of this invention are compounds comprising recurring structural units of the formula

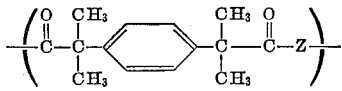

wherein Z may be described as a divalent organic radical selected from (1) the group consisting of radicals of the formula

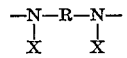

wherein R is selected from the group consisting of alkylene, arylene, aralkylene, alkarylene, alicyclic radicals and the like including ring compounds linked by bridging atoms or bivalent groups including those structures having substituent groups which are not reactive under the conditions for polymer preparation and X is selected from the group consisting of hydrogen atoms and lower alkyl radicals, and (2) the group consisting of radicals of the formula

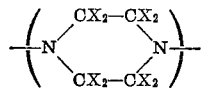

wherein X is the same as defined above, each X being the same or different. These polycarbonamides are prepared by effecting a reaction between p-phenylenebis(dimethylacetic acid) or an amide-forming derivative of said acid reactant and a suitable diamine. The reaction is continued until a high molecular weight synthetic linear polycarbonamide is formed.

The p-phenylenebis(dimethylacetic acid) used to prepare the novel polycarbonamides of this invention has the following formula

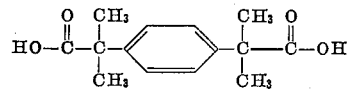

In addition, amide-forming derivatives of p-phenylenebis(dimethylacetic acid) may be used for the purposes of this invention. Amide-forming derivatives refer to those compounds which are acid derivatives but react with a diamine of the class described below to form recurring amide linkages. Such amide-forming derivatives include anhydrides, acid halides, half esters, and diesters that form amide linkages when reacted with primary or secondary amines. Therefore, p-phenylenebis(dimethylacetyl chloride) and dimethyl esters of p-phenylenebis(dimethylacetic acid) would be amide-forming derivatives of p-phenylenebis(dimethylacetic acid) since both will undergo a condensation reaction with a diamine to produce the same polycarbonamide as may be obtained by heating salts made from equimolar proportions of the diacid and the diamine in the dry state or in the melt.

The p-phenylenebis(dimethylacetic acid) used to prepare the polycarbonamides of this invention may be prepared by a two step method comprising (1) heating p-phenylenebis(dimethylacetonitrile) with an excess of phosphoric acid at a temperature of from about 90° C. to about 125° C. to convert the dinitrile to a nitrogen containing intermediate product and (2) heating this product to reflux with an alkali hydroxide to give nitrogen-free, pure p-phenylenebis(dimethylacetic acid) in high yield. A more detailed discussion of the preparation of the p-phenylenebis(dimethylacetic acid) may be found in co-pending U.S. Patent application No. 264,753, filed March 13, 1963, now U.S.P. 3,285,956, in the name of Holsten et al.

The diamines employed in the preparation of the polycarbonamides are aliphatic, alicyclic, aromatic, or heterocyclic diamines. These diamines are selected from the group consisting of (1) diamines of the formula

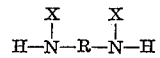

wherein R is selected from the group consisting of alkylene, arylene, aralkylene, alkarylene, and alicyclic radicals, and X is selected from the group consisting of hydrogen atoms and lower alkyl radicals, and (2) diamines of the formula

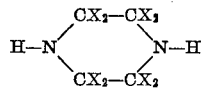

wherein X is the same as defined above, each X being the same or different. Illustrative of suitable diamines that may be used to prepare the polycarbonamides of this invention are ethylenediamine, tetramethylenediamine, pentamethylenediamine, hexamethylenediamine, octamethylenediamine, p-xylylenediamine, cyclohexylenediamine, p-phenylenediamine, p,p'-methylenedianiline, tolylenediamine, piperazine, 2,5-dimethylpiperazine, benzidine, 1,16 - diaminohexadecane, 1,3 - propanediamine, 2,2' - p-phenylenebis(2,2 - dimethylethylamine), 1,4-bis(2-aminoethyl) benzene 1,4-bisaminomethylcyclohexane, and the like.

The polycarbonamides embodied herein can be prepared by several different methods. For example, they can be prepared by heating substantially equimolecular amounts of p-phenylene(dimethylacetic acid) and a suitable diamine under condensation polymerization conditions, generally from about 100 to about 325° C., in the presence or absence of an inert diluent until relatively high molecular weight linear condensation polycarbonamides are obtained, and preferably until the polycarbonamides possess fiber-forming properties and exhibit cold-drawable characteristics. Moreover, the diamine and the p-phenylenebis(dimethylacetic acid) may be intimately mixed in proper proportions with the mixture being subjected to condensation polymerization conditions wherein the first reaction that occurs is the formation of diamine-dicarboxylic acid salts, followed by polymerization in the second step to form the polycarbonamides. At the high temperatures which may be employed, the polymerizing mixture is susceptible to oxidation by air, or even traces of oxygen. Oxidation causes darkening and degradation of the polymer, although these polyamides are considerably more resistant to degradation under these conditions than the usual polyamides. Accordingly, it is desirable to exclude oxygen from the reaction vessel where elevated temperatures are employed. This can be accomplished by sweeping out the vessel with nitrogen or other inert gas prior to the initiation of the reaction and maintaining the oxygen-free atmosphere in the reactor during the polymerization.

It is possible and sometimes desirable to prepare the polycarbonamides of this invention by reaction of the diacid chloride and diamine according to the general procedures of the Schotten-Baumann Reaction. The reaction mixture which consists of a suitable diamine and the diacid halide of p-phenylenebis(dimethylacetic acid), initially existing in separate substantially immiscible liquid phases at least one of which contains a diluent, is stirred. The process for the preparation of the polycarbonamides herein by interphase polymerization can be carried out over a considerable range of temperatures. However, in view of the rapidity with which the polycarbonamides are formed at moderate temperatures, there is no real advantage in using temperatures higher than 150° C.; and it is preferred that the reaction be carried out at about room temperature or lower. At room temperature it is often desirable that the two phases containing the separate reactants be stirred rapidly to produce an emulsion of fine particle size. When such an emulsion is provided, the diamine and the diacid chloride are completely reacted in a matter of at most a few minutes, depending to some extent on the reaction conditions employed. The concentration of the reactants in the separate phases can vary over wide limits and one still can produce a high molecular weight polycarbonamide. It is usually advantageous to employ emulsifying agents to facilitate the reaction. It is likewise desirable to use an acid acceptor for the hydrogen halide that is produced in the course of the reaction of the amine and the acid halide. The diamine itself can serve as the acceptor. However, to avoid the need of an excess of diamine reactant, one may add a sufficient amount of an acid acceptor in the amount which is equivalent to the amount of hydrogen halide produced. The acid acceptor may be sodium hydroxide, sodium carbonate, or a tertiary amine, and the like.

A prepolymer may be prepared by the reaction of the diacid or selected derivatives of the diacid such as the diacid chloride or the diesters with stoichiometric amounts of the diamine, including slight excess of the diamine over the stoichiometric amount, in a suitable solvent, such as tetrahydrofuran. The prepolymer is isolated, dried, and finished to high molecular polymer by heating the prepolymer further in the dry state, in the melt, or in a suitable solvent.

While the present invention includes the production of polymers of relatively low molecular weight that are useful in the manufacture of coating compositions, lacquers, and the like, it is primarily concerned with the production of polymers that have film and filament-forming properties. It is preferred that molecular weight of the polymer should be in the fiber forming range as indicated by the inherent viscosity. The inherent viscosity of the polymer should be about 0.4 or greater. Inherent viscosity is defined as $ln\eta r/C$ in which $\eta r$ is the viscosity of a dilute solution of the polymer divided by the viscosity of the solvent in the same units and at the same temperature, and C is the concentration in grams of the polymer per 100 ml. of solution. The inherent viscosities are measured at 20° C. and at a concentration of 0.5 gram per 100 ml. of solution.

Filaments may be produced by melt spinning, i.e., by extruding a melt of the polymer through suitable orifices in a spinneret and into a cooling atmosphere. The streams of polymer that emerge vertically downwardly from the spinneret solidify in the atmosphere to form filaments.

Filaments may also be produced by conventional wet spinning where a solution of the polymer is extruded through orifices in a spinneret and into a liquid coagulating bath or by conventional dry spinning where a solution of the polymer is extruded through orifices in a spinneret and into a medium containing an evaporative gas. If the polymer has a sufficiently high molecular weight, the filament so formed may be cold drawn into filaments having good physical properties.

In producing the polycarbonamides of the present invention, the polymerization may be carried out in the presence of a catalyst, as well as in the presence of molecular weight regulators and the like, if desired. Other additives that modify the polymers such as delusterants, plasticizers, pigments, colorants, antistatic agents, and the like may also be incorporated in the polymer if desired. The polymerization may be conducted in batch lots, by continuous methods, or by semicontinuous methods. In general, the process employed to prepare the novel linear polycarbonamides involves a polymerization reaction which is easily controlled and requires no special equipment.

It will be apparent from the foregoing description that the present invention provides a new class of polycarbonamides and a method for producing these polycarbonamides. A particular advantage of the invention is that the polymers produced display excellent stability to heat, moisture, air, and the like. A further advantage of the invention is that the reaction between the diamine and the p-phenylenebis(dimethylacetic acid) may be carried to completion in a reasonable time at sub-atmospheric, or super-atmospheric pressure and at relatively low or elevated temperatures. Furthermore, polymers having fiber-forming properties and displaying melting points above 200° C. are obtainable. In addition, drawn fibers made from the polymers of this invention undergo a marked shrinkage when heated to temperatures of about the second order transition point of the polymer. Such fibers should find utility in upholstery fabrics and materials which are easily formed to a shape by shrinkage upon application of heat, steam, or the like.

The invention will now be more fully explained by the following examples. However, it should be understood that these are given by way of illustration, not of limitation, and that many changes may be made in the details without departing from the spirit of the present invention. In the examples, all parts and percentages are by weight unless otherwise indicated. The polymers produced in the examples below melted to give a clear melt in addition to possessing high melting points.

Example 1

In a one liter Waring Blendor, 130 ml. of water, 60 ml. of carbon tetrachloride, 41 ml. of 1N sodium hydroxide, and 3.16 grams of a 73 percent aqueous solution of hexamethylenediamine (0.02 mole) were stirred and cooled to 3° C. The carbon tetrachloride was employed to suspend the acid chloride subsequently added and to act as a swelling agent for the polymer produced. The base was employed to accept the hydrogen halide produced during the condensation reaction. A solution containing 5.74 grams (0.02 mole) of p-phenylenebis(dimethylacetyl chloride) dissolved in 40 ml. of carbontetrachloride was added to the mixture. The resulting mixture was stirred for 10 minutes. The resulting precipitated white polymer was then isolated and dried. The polymer was found to have a melting point of 197–198° C. using a Fisher-Jones melting point apparatus. Filaments were melt spun from the polymer using conventional spinning procedures. The filaments developed good strength and opacity upon hot drawing at a temperature of about 80 to 90° C.

Example 2

In a Waring Blendor, 130 ml. of water, 3.61 grams (0.02 mole) of ethylenediamine, 70 ml. of carbon tetrachloride, 0.13 grams of Dupanol ME (Du Pont Company, sodium lauryl sulfate), and 41 ml. of 1N sodium hydroxide were stirred and cooled to 3° C. The Dupanol ME was added as an emulsifying agent. Approximately 5.74 grams of (0.02 mole) of p-phenylenebis(dimethylacetyl chloride) was added to the stirred mixture and stirring was continued for 10 minutes. The resulting precipitated white polymer was isolated, washed, and dried. This polymer had a melting point of about 280° C. as determined on a Fisher-Jones melting point apparatus. Filaments were melt spun from the polymer using conventional spinning procedures. These filaments developed good strength upon hot drawing at about 150° C. These drawn fibers were observed to shrink markedly upon reheating under low tension to about 140° C.

Example 3

Polymer was prepared following the procedure of Example 2 using 0.02 mole of 1,16-diaminohexadecane in place of the ethylenediamine. A polymer having a melting point of 145–147° C. as determined on a Fisher-Jones melting point apparatus was obtained. Filaments were melt spun from this polymer using conventional spinning procedures. These filaments were cold-drawn and developed good strength. The drawn filaments shrank markedly by heating at about 55° C. under low tension.

Example 4

Polymer was prepared following the procedure of Example 2 using 0.02 mole of 1,2-propanediamine in place of the ethylenediamine. A polymer having a melting point of 225° C. as determined on a Fisher-Jones melting point apparatus was obtained. Filaments were melt spun from this polymer using conventional spinning procedures. These filaments were hot drawn at about 130° C. to give white opaque, strong filaments. The drawn filament under low tension shrank markedly when heated to about 120° C.

Example 5

To a slurry of 4.4 grams (0.02 mole) of 2,2′-p-phenylenebis(2,2-dimethylethylamine) in 100 ml. of water containing 4.3 grams of sodium carbonate, 0.15 gram of Dupanol ME, and 70 ml. of carbon tetrachloride at a temperature of 30° C. was added about 5.74 grams (0.02 mole) of p-phenylenebis(dimethylacetyl chloride). The resulting precipitated polymer was isolated, washed, and dried. A polymer having a melting point in the range of 220–275° C. as determined on a Fisher-Jones melting point apparatus was obtained.

Example 6

A quantity of 5.74 grams of p-phenylenebis(dimethylacetyl chloride) was dissolved in 50 ml. of chlorobenzene and the resulting solution was added to an emulsion containing 2.28 grams (0.02 mole) of 2,5-dimethylpiperazine, 100 ml. of water, 4.3 grams of sodium carbonate, and 0.13 gram of Dupanol ME. The resulting precipitated white polymer was isolated, washed and dried. This polymer had a melting point of 380° C. as determined on a Fisher-Jones melting point apparatus with a softening of the polymer occurring at about 280° C.

Example 7

A mixture consisting of 100 ml. of water, 4.3 grams of sodium carbonate, 40 ml. of carbon tetrachloride, 1.72 grams (0.02 mole) of piperazine, and 0.13 grams of Dupanol ME was stirred at 5° C. to form an emulsion. To this emulsion, 5.74 grams (0.02 mole) of p-phenylenebis(dimethylacetyl chloride) was added. The mixture was stirred for 20 minutes. The resulting precipitated polymer was isolated, washed and dried. This polymer melted at about 400° C. as determined on a Fisher-Jones melting point apparatus. Thermogravimetric analysis of a polymer sample showed no appreciable weight loss up to 450° C.

Example 8

To a solution of 3.68 grams of benzidine in 40 ml. of dimethylacetamide containing 2 grams of lithium chloride, 5.70 grams (0.02 mole) of p-phenylenebis(dimethylacetyl chloride) was added and the resulting mixture was stirred at a temperature of 25° C. As the polymer formed, the polymer precipitated from the solution and the mixture became thick. An additional 30 ml. of dimethylacetamide was added with continued stirring. The product was mixed with water in a Waring Blendor with rapid stirring. The polymer was then isolated, washed with methanol and dried. This polymer appeared to soften and melt at about 300° C. as determined on a Fisher-Jones melting point apparatus.

Example 9

To a mixture of 100 ml. of water, 2.16 grams (0.02 mole) of p-phenylenediamine, 4.3 grams of sodium carbonate, 0.13 gram of Dupanol ME, and 40 ml. of carbon tetrachloride contained in a Waring Blendor, 5.74 grams (0.02 mole) of p-phenylenebis(dimethylacetyl chloride) was added. The mixture was held at a temperature of 25° C. and stirred for approximately 10 minutes. The precipitated polymer was then isolated, washed and dried. This polymer melted with decomposition at about 360° C. as determined on a Fisher-Jones melting point apparatus.

Example 10

Polymer was prepared following the procedure of Example 9 using 0.02 mole of p-xylylenediamine in place of the p-phenylenediamine. The polymer obtained had a melting point of about 260° C. as determined on a Fisher-Jones melting point apparatus.

Example 11

Polymer was prepared following the procedure of Example 9 using 0.02 mole of 1,4-bis(2-aminoethyl) benzene in place of the p-phenylenediamine. A polymer having a melting point of about 230° C. as determined on a Fisher-Jones melting point apparatus was obtained. Filaments were obtained by melt spinning this polymer using conventional spinning procedures. The filament was hot drawn at about 90° C. to give a fiber having good strength. Upon heating the drawn fiber under low tension at 110° C., the fiber shrank appreciably.

Example 12

An emulsion consisting of 59 ml. of water, 41 ml. of 1N sodium hydroxide, 2.54 grams (0.02 mole) of 1,4-bisaminomethylcyclohexane (a mixture of the cis-and trans-forms), 0.13 gram of Dupanol ME and 55 ml. of carbon tetrachloride was cooled to 3° C. A quantity of 5.74 grams (0.02 mole) of p-phenylenebis(dimethylacetyl chloride) in 40 ml. of carbon tetrachloride was added to the emulsion with vigorous stirring. The temperature of the reaction mixture rose to 35° C. within 15 minutes. The resulting precipitated polymer was isolated, washed and dried. The softening point of the polymer was found to be about 300° C. Thermogravimetric analysis of a sample of a polymer showed no appreciable loss of weight up to 450° C.

Example 13

Twenty five grams of salt made from equimolar amounts of p-phenylenebis(dimethylacetic acid) and hexamethylenediamine in 15 ml. of water was heated in a stirred autoclave at 300° C. and 250 p.s.i.g. until the reaction temperature reached 320° C., with continuous removal of the water of reaction at 250 p.s.i.g. Thereupon heating was discontinued and the reaction temperature lowered to 210° C. for extrusion of the polymer. Filaments were readily drawn from a melt of the polymer and were hot drawn at 100° C. to develop strength, flexibility and opacity.

As many widely different embodiments of this invention may be made without departing from the spirit and scope thereof, it is to be understood that the invention is not limited to the specific embodiment thereof, except as defined in the appended claims.

What is claimed is:

1. A fiber-forming linear carbonamide polymer consisting essentially of recurring structural units of the formula

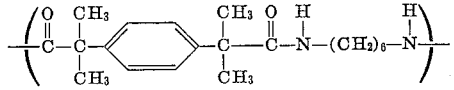

2. A fiber of the polymer as defined in claim 1.

References Cited

UNITED STATES PATENTS

| | | | |
|---|---|---|---|
| 2,130,948 | 9/1938 | Carothers | 260—78 |
| 2,244,192 | 6/1941 | Flory | 260—78 |
| 2,497,673 | 2/1950 | Kirk | 260—78 |
| 2,831,834 | 4/1958 | Magat | 260—78 |
| 2,918,454 | 12/1959 | Graham | 260—78 |
| 3,197,444 | 7/1965 | Moody | 260—78 |

FOREIGN PATENTS

| | | |
|---|---|---|
| 627,733 | 8/1949 | Great Britain. |

WILLIAM H. SHORT, *Primary Examiner.*

SAMUEL H. BLECH, *Examiner.*

H. D. ANDERSON, *Assistant Examiner.*